(12) United States Patent
Mazzagatti et al.

(10) Patent No.: US 7,908,240 B1
(45) Date of Patent: Mar. 15, 2011

(54) FACILITATED USE OF COLUMN AND FIELD DATA FOR FIELD RECORD UNIVERSE IN A KNOWLEDGE STORE

(75) Inventors: Jane Campbell Mazzagatti, Blue Bell, PA (US); Jane Van Keuren Claar, Bethlehem, PA (US)

(73) Assignee: Unisys Corporation, Blue Bell, PA (US)

( * ) Notice: Subject to any disclaimer, the term of this patent is extended or adjusted under 35 U.S.C. 154(b) by 796 days.

(21) Appl. No.: 10/975,223

(22) Filed: Oct. 28, 2004

(51) Int. Cl.
*G06F 7/00* (2006.01)
*G06F 17/00* (2006.01)

(52) U.S. Cl. .............................. 707/101; 707/3; 707/10

(58) Field of Classification Search ............... 707/1–10, 707/100–104.1, 200–206
See application file for complete search history.

(56) References Cited

U.S. PATENT DOCUMENTS

| | | | |
|---|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |
| 5,966,709 A | 10/1999 | Zhang |
| 5,970,490 A | 10/1999 | Morgenstern |
| 5,978,794 A | 11/1999 | Agrawal et al. |
| 5,983,232 A | 11/1999 | Zhang |
| 6,018,734 A | 1/2000 | Zhang |
| 6,029,170 A | 2/2000 | Garger |

(Continued)

FOREIGN PATENT DOCUMENTS

EP  0 079 465  1/1985

(Continued)

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.*

(Continued)

*Primary Examiner* — Jean B. Fleurantin
(74) *Attorney, Agent, or Firm* — Richard J. Gregson; Robert P. Marley

(57) ABSTRACT

Typically, field names are saved separately from tables as metadata in modern databases. Databases did not traditionally get built into interlocking trees datastores that recorded the data as events. However, in cases where one may wish to do that, thus avoiding the need for saving separate metadata from the table data of the data base, a need was found to establish an identity for particular columns or fields when working with databases or sources of data that provide table data in field/record format. So, to build interlocking trees datastores from such records a mechanism to record such data was created, adding a column ID, preferably to each field within each record or sequence that is to be recorded. Putting the column ID or identifier is inserted into the record during particlization between each column variable. In preferred embodiments a delimiter was included between the column ID or field name and the field variable. Appropriate hardware and software systems were employed to implement the invention.

16 Claims, 17 Drawing Sheets

U.S. PATENT DOCUMENTS

| | | | |
|---|---|---|---|
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 * | 10/2002 | Kothuri et al. .............. 707/100 |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 * | 7/2003 | Williams .............. 707/102 |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Their et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskiy |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Daniel Cohen, Introduction to Computer Theory, 1997, John Wiley & Sons, Inc., 2nd Edition, 419-423.*

Heng Ji; et al., Summarizing based on concept counting and hierarchy analysis, Oct. 6-9, 2002, IEEE, vol. 3, 6 pages.*

Qi et al., A genetic K-means approaches for automated Web page classification, Nov. 8-10, 2004, IEEE, 241-246.*

Burton F. W. et al: "Multiple Generation Text Files Using Overlaping Tree Structures", Computer Journal, Oxford University Press, Surrey, GB. vol. 28, No. 4 Aug. 1985, pp. 414-416.

Gschia-Yuan Teng & David L. Neuhoff, "An Improved Hierarchical Lossless Text Compression Algrithm", Proceedings 1995 Data Compression Conference, All Pages.

Jeffrey O. Kephart & David M. Chess, "The Vision of Autonomic Computing", T.J. Watson Research Jan. 2003, All Pages.

Linda Dailey Paulson, "Computer System, Heal Thyself", Aug. 2003, All Pages.

Dave Gussow, "Headline: IBM-Enterprise Storage Server Shines at Colgate Palmolive", Jan. 6, 2003, All Pages.

Caroline Humer, "IBM Creates Self-Healing Computer Unit", Jan. 8, 2003, All Pages.

* cited by examiner

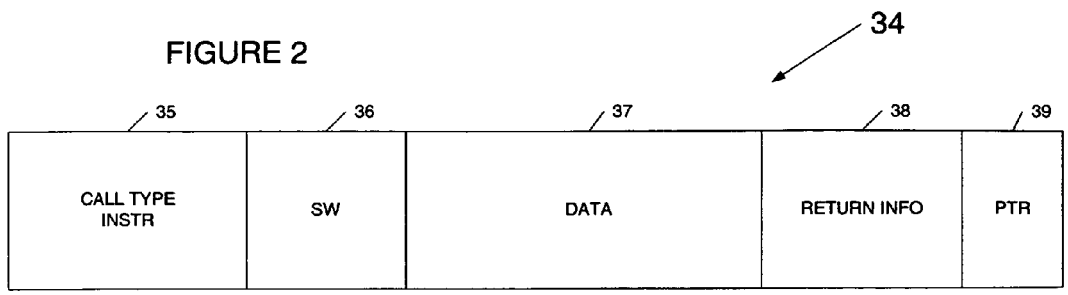
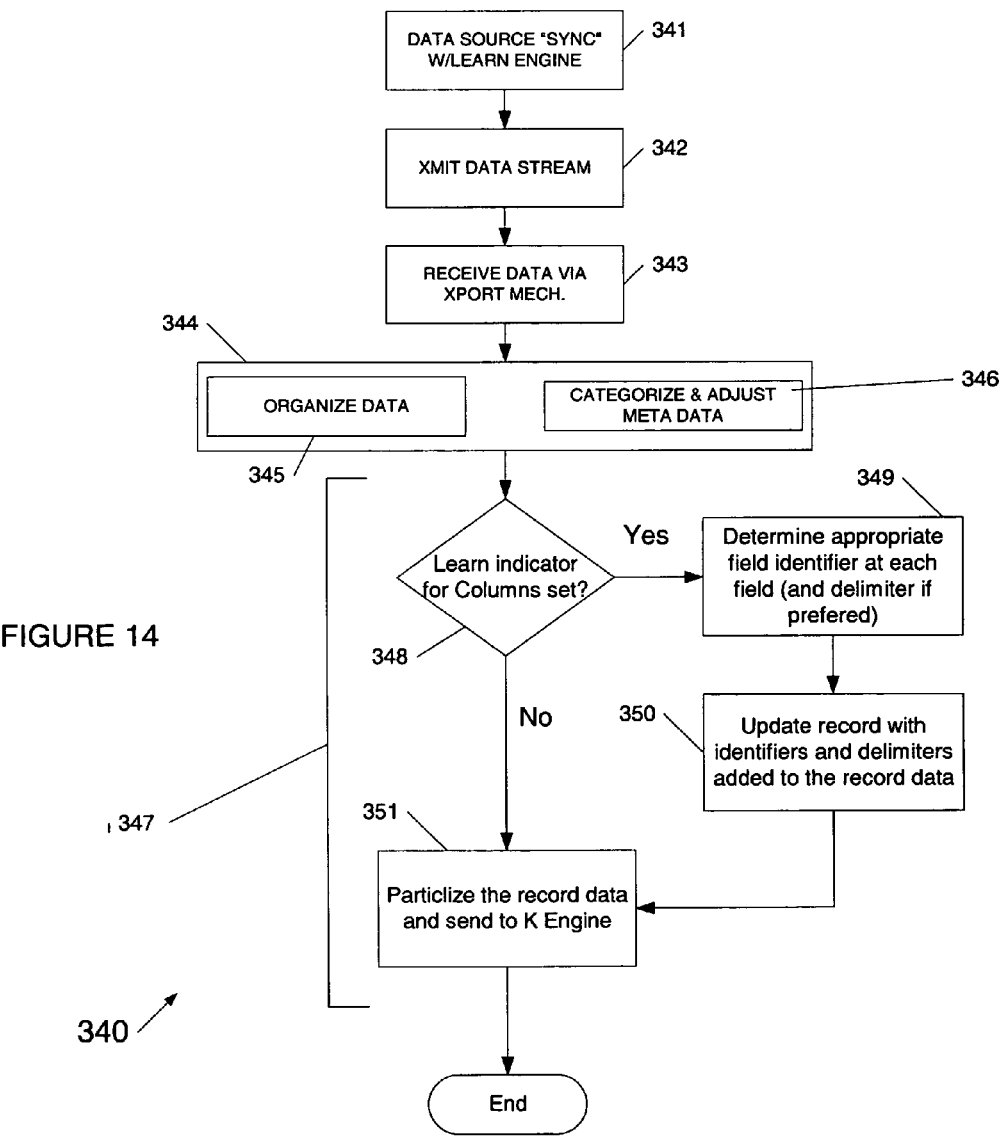

Fig.4

- Bill Tuesday 100 sold PA
- Bill Tuesday 100 sold PA
- Bill Tuesday 100 sold PA
- Bill Tuesday 100 sold PA
- Bill Tuesday 100 sold PA
- Bill Tuesday 100 sold PA
- Bill Monday 103 sold NJ
- Bill Monday 100 trial PA
- Bill Monday 100 trial PA
- Bill Monday 100 trial PA
- Tom Monday 100 sold PA
- Tom Monday 100 sold PA
- Tom Monday 103 trial NJ
- Tom Monday 103 trial NJ
- Tom Monday 103 trial NJ Bill Tuesday 100 sold 100
Bill Tuesday 100 sold 100
Bill Tuesday 100 sold 100
Bill Tuesday 100 sold 100
Bill Tuesday 100 sold 100
Bill Tuesday 100 sold 100
Bill Monday 103 sold 103
Bill Monday 100 trial 100
Bill Monday 100 trial 100
Bill Monday 100 trial 100
Tom Monday 100 sold 100
Tom Monday 100 sold 100
Tom Monday 103 trial 103
Tom Monday 103 trial 103
Tom Monday 103 trial 103

Fig. 6

1;Bill 2:Tuesday 3:100 4:sold 5:100
1;Bill 2:Tuesday 3:100 4:sold 5:100
1;Bill 2:Tuesday 3:100 4:sold 5:100
1;Bill 2:Tuesday 3:100 4:sold 5:100
1;Bill 2:Tuesday 3:100 4:sold 5:100
1;Bill 2:Tuesday 3:100 4:sold 5:100
1;Bill 2:Tuesday 3:100 4:sold 5:100
1;Bill 2:Monday 3:103 4:sold 5:103
1;Bill 2:Monday 3:100 4:trial 5:100
1;Bill 2:Monday 3:100 4:trial 5:100
1;Bill 2:Monday 3:100 4:trial 5:100
1:Tom 2:Monday 3:100 4:sold 5:100
1:Tom 2:Monday 3:100 4:sold 5:100
1:Tom 2:Monday 3:103 4:trial 5:103
1:Tom 2:Monday 3:103 4:trial 5:103
1:Tom 2:Monday 3:103 4:trial 5:103

FIGURE 8

```
Salesp:Bill  day:Tuesday  Item#:100  dis:sold   price:100
Salesp:Bill  day:Tuesday  Item#:100  dis:sold   price:100
Salesp:Bill  day:Tuesday  Item#:100  dis:sold   price:100
Salesp:Bill  day:Tuesday  Item#:100  dis:sold   price:100
Salesp:Bill  day:Tuesday  Item#:100  dis:sold   price:100
Salesp:Bill  day:Tuesday  Item#:100  dis:sold   price:100
Salesp:Bill  day:Monday   Item#:103  dis:sold   price:103
Salesp:Bill  day:Monday   Item#:100  dis:trial  price:100
Salesp:Bill  day:Monday   Item#:100  dis:trial  price:100
Salesp:Bill  day:Monday   Item#:100  dis:trial  price:100
Salesp:Tom   day:Monday   Item#:100  dis:sold   price:100
Salesp:Tom   day:Monday   Item#:100  dis:sold   price:100
Salesp:Tom   day:Monday   Item#:103  dis:trial  price:103
Salesp:Tom   day:Monday   Item#:103  dis:trial  price:103
Salesp:Tom   day:Monday   Item#:103  dis:trial  price:103
```

FIGURE 10

FACILITATED USE OF COLUMN AND FIELD DATA FOR FIELD RECORD UNIVERSE IN A KNOWLEDGE STORE

FIELD OF THE INVENTION

This invention relates to the field of manipulation of interlocking trees datastores, particularly to incorporating field context of data records into interlocking trees datastores in particular ways.

BACKGROUND OF THE INVENTION

We have developed a system and various methods for creating and using interlocking trees datastores and various features of said interlocking trees datastores. We refer to an instantiation of these interlocking trees datastores that we have developed as a "KStore" or just "K". In particular, these structures and methods have been described in copending patent applications U.S. Ser. Nos. 10/385,421, (now published as US 20040181547 A1) and 10/666,382, by inventor Mazzagatti. Additionally, we described a system in which such interlocking trees datastores could more effectively be used in U.S. Ser. No. 10/879,329. We hereby incorporate these referenced patent documents in their respective entireties into this patent by this reference. While the system and method we describe in this patent relate with particularity to the specific interlocking trees datastores which inventor Mazzagatti hereof described in the above-referenced patent (applications), it should be readily apparent that the system and methods described herein may also be applicable to similar structures.

While the interlocking trees datastores structure created by the system originally described in co-pending patent application U.S. Ser. No. 10/385,421, and the means for the Learn Engine taught in co-pending patent application U.S. Ser. No. 10/879,329 to accept multiple fields, hereinafter also referred to as columns, of data within a single data record to create the interlocking trees datastore structure, provides many useful traits for understanding and using the inventions described, heretofore the use of multiple fields within a single record has had an inherent difficulty in use.

As taught by copending application U.S. Ser. No. 10/879,329, the KStore Learn engine can accept multiple fields of data within a single data record, such as an entire transaction record consisting of fields such as salesperson, Day, Item number, disposition, and state. In the just described example, if the "columns" of the record (i.e., the field names) contained data that were dissimilar in nature, i.e. numbers, days, names, etc., the previous method of creating and updating the interlocking trees datastore, hereinafter referred to also as 'KStore', as taught by the patents referenced above were not capable of maintaining the distinction, or relationship, between the field variable and the field name context. This is a difficulty in the previous teachings because of the likelihood or possibility that similar data can appear in different fields or columns, thus providing a potential for confusion in interpretation. As currently taught, the inherent human-comprehensible distinction between the fields can be lost when the Learn Engine accepts incoming data records with multiple columns if more than one column contains data similar to (or with the same variable values as) that contained in other columns within the same or different record. For example, if in one column a record has a price field and in another record a column represents a price of something else, conflation and resultant confusion is a strong potential in interpreting the data from the KStore.

Such confusion can hinder the ability of the user to properly analyze the data contained within the Kstore. A number that represents one concept in a certain column can represent an entirely different concept in another column. Without integrating the distinction between the columns in the Kstore data structure, when performing analytic functions on the Kstore, there is a risk that, for example, information from two columns may even be recorded as a plurality of occurrences of a single event, even though they should be recorded as multiple events.

Given that the data structure did not exist prior to the teaching of the applications lists above, there did not exist a solution for recovering the distinction between the columns by integrating the knowledge of the column context into the Kstore structure. Accordingly, a new method of integrating the knowledge into the Kstore structure was designed. Therefore, the ability to integrate the field context distinction in the Kstore was unavailable prior to the invention described in this patent.

It should be clear that a single data record recorded into a KStore might contain columns of data defined within varying contexts. If the user does not expect or anticipate that data contained within a column is similar in nature, e.g. both columns have numbers, to data contained within a different column in the same or different data record, then it may not be useful to integrate the distinction between the columns in the Kstore data structure. Take for example, a data record that contains the fields "salesperson," "Day," "Item number," "disposition" and "state." It is readily apparent how the data records in this example contain dissimilar data amongst the columns, and subsequently, from accompanying data records or stored into the same Kstore. If however, the user expects that there exists the likelihood or possibility that different data columns can contain similar types of data but represent different meanings, or contexts, it may be important to integrate the distinction of the column contexts into the Kstore data structure. Take, for example, the data records containing the following fields: "salesperson," "Day," "Item number," "disposition" and "price." The user would likely anticipate the possibility that the price field may contain data similar in nature and amount as the Item number. In this case, if the data for the price and Item number were the same, say across two different records, i.e. the same number like for example "60", the number of occurrences for the price 60 could be combined with the number of occurrences of 60 where it represents an item number. Thus the root node with the value 60 would have a count of two 60s. This loss of distinction may frustrate analytic queries when focused on the data number (i.e., when trying to find how many 60's there are in an inventory by looking first or only at the root node 60).

SUMMARY OF THE INVENTION

If the user determines that there exists the probability that similar data can be contained within varying columns in the same or different data records, the knowledge of the column context should preferably be integrated into the Kstore data structure.

There can be many ways to accomplish this, but one preferable way to do this is to indicate to a learn function (one learn function we have described is executed by a Learn Engine in cooperation with a K Engine) building a KStore that the position of the data in the data record sequence is important and have the learn function assign a column number to each variable. One way we have chosen to do this is to concatenate the column number (or column name) to the variable with a delimiter, in order to allow for easy differentiation between the column number or name and the variable. Thus the sensor having column information is actually a root node a level above the root nodes at the sensor level we have defined before. This will become more clear with reference to the figures and the detailed description. The method, upon indication from a Learn Engine (performing the learn function) that the column number is set, adds the column number (or name) and a delimiter, such as a semicolon ':' to each variable. The Learn Engine will either have this information at the configuration stage or when it receives information from a new source.

The configuration of the Learn Engine will indicate to the learn function that the position in the sequence is important and have the learn function assign a column number to each variable. The column number would be concatenated to the variable with a delimiter to differentiate easily between the column and the variable. For example an indicator would be set to signal the learn function in processing to affix the column number to the variable. The learn function process would test the indicator and if the indicator is set, would add the field number and a delimiter such as a colon ':' or unprintable character to each variable. The updated record will then be sent to the KStore Engine (K Engine) a particle at a time.

A record generally consists of a set of fields or columns, each such column containing some data, that data within a column being variable in length, type and so forth. We generally refer to such data within a column in a record as a variable in this document. These concepts should be commonly understood in reference to databases. We also refer to the record as a sequence, since it has a beginning and an end, and after being particlized in the learn function, it becomes a sequence of particles. In this invention, the sequence of particles from a record input from any data source includes column names (or other identifiers such as numerals etc.). The sequence of particles also preferably, includes delimiters interposed between each variable in the record sequence. This inclusion of delimiters is accomplished in the learn function as those variables within the record sequence are particlized to form the sequence of particles that is sent to the K Engine. The sequence of particles including the delimiters will be recorded by the K Engine as an event sequence in a KStore.

Thus the particles will be recorded as an event path consisting of nodes recorded in the KStore, and that event path will have included additional nodes that indicate to which column each node (or set of nodes that form each variable) in the event path belongs. Also there will be, in nodes of preferred embodiments, a delimiter indicating where the column name or number ends and the record data for this column begins will be included in the path created by the recording in K of the record sequence. A preferred delimiter is the colon (:) although semicolons, commas, or any short symbol would also be good to use for this function.

In another preferred embodiment, the learn function can be segmented into a front end component that includes the column identifiers and delimiters within the sequence prior to sending the sequence to the Learn Engine for further processing. This front end component could be configured by an application or an application developer without access to an API Utility function for modifying the Learn Engine or K or any of the other components of a KStore system. Such limited access will make it easier to guard the internal functions of the KStore system and the K itself against misconfiguration and error. The front end component can also be used to otherwise configure the sequences, interpreting HTML and stripping unwanted data from the record as may be desired or needed by the application or the application developer.

We describe the generalized KStore structure and functions in general in the rest of this summary, and briefly describe how this invention is structured within that set of concepts. As is described in earlier patents on the preferred mode of interlocking trees datastore, (the varieties we use often called a "KStore") each level of the tree-based datastore comprises a first tree that depends from a first root node and may include a plurality of branches. The first root may represent a concept, such as but not limited to, a level begin indicator. Each of the branches of the first tree ends in a leaf node or end product node. A second root of the same level of the tree-based datastore is linked to each leaf node of the first tree that represents an end product. Hence, the second root is essentially a root to an inverted order of the first tree or subset of the first tree, but the first tree is not duplicated. The second root may represent a concept, such as but not limited to, a level end indicator. Finally, the tree-based datastore comprises a plurality of trees in which the root node of each of these trees may include data such as a dataset element or a representation of a dataset element. This type of root node is referred to herein as an elemental root node. The elemental root node of each of these trees may be linked to one or more nodes in one or more branches of the unduplicated first tree. The non-root nodes of the tree-based datastore essentially contain only pointers to other nodes in the tree-based datastore, and may contain additional fields wherein one such additional field may be a count field. The roots of the trees in the forest of trees comprising each level of the tree-based datastore are also comprised of pointers, however the root nodes may, in addition, contain data that represents information (i.e., contain data that is or represents data such as dataset elements or concepts such as level begin or level end indicators); all the other nodes of the tree-based datastore only point to other nodes and contain essentially no data. As an example, the data may be an integer that is associated with a character, a pixel representation, a condition such as begin indicator, end indicator, beginning of field indicator or the like, although the invention is not so limited. Multiple levels of the above-described tree-based datastore may be generated and accessed; the end products of a lower level becoming the elemental root nodes of the next level.

The structure of the nodes themselves is generally maintained through a limited set of data fields per node. There are fields for the Case, the Result, the asCase list pointer, the asResult list pointer and additional fields including at least a count field in most forms of the structure, as well as a value field for each elemental root node. Therefore, when receiving particlized data from multiple columns containing the same value of data but in different contexts, the structure of the node, whether an elemental root node or a node generated upon the elemental root node, may be ambiguous as to from which column the data originated.

In this new invention, we find that there are a different kind of root nodes used to identify each field variable. These root nodes identify variable pairs, preferably with a delimiter between them, the first value of the pair being a column name or other identifier, and the second variable being the value that is in that column or field. Thus we could say that these new root nodes cover a concatenated pair of values.

A means for building an interlocking trees datastore that can receive data records with a plurality of columns and the ability to integrate the knowledge of those columns within the Kstore data structure to permit accurate analysis of data was needed, and is thus described herein. Should it be necessary to maintain or recover the distinction between the columns, the present invention teaches how the data records are handled, indicating the context of their origin. The present invention also teaches how the appending of information to the data records causes the Kstore Engine to use a new kind of root nodes that represent not only the value of the variable but also the context for the variable.

BRIEF DESCRIPTION OF DRAWINGS

The foregoing summary, as well as the following detailed description of embodiments of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a block diagram of a message packet in accordance with a preferred embodiment of the invention;

FIG. 4 is an example of a set of records, organized in a typical field/record table, of sales team activities to be in which the data set columns contain dissimilar data;

FIG. 6 is an example of a tabularized record set of sales team activities in which one set of values in one column is the same as a set of values in another column, but these same values have different meanings due to their column locations;

FIG. 8 is an example of an updated record set of sales team activities from FIG. 6 reflecting changes to the nature of the data that would be sent to a K Engine to build a KStore using the current invention;

FIG. 10 is an example of the updated record set of sales team activity from FIG. 6 to be received by the Kstore Engine using another preferred embodiment of the invention employing names instead of column numbers;

FIG. 14 is a flow chart of a method for incorporating column information into a KStore.

DETAILED DESCRIPTION OF PREFERRED EMBODIMENTS

Since this patent is about handling column information, we believe a clear definition of columns is in order. A column is the equivalent of a field. These terms field and column both mean those parts a record is composed of. They can be viewed as headers or bins of a record into which information is put. Thus if we have a record with four columns, it might contain a variable in each of these fields, and a database consisting of a set of these records would have many variables, but in common databases, only four fields or columns. A field variable has meaning in the context of the field, which meaning it may not have without an association with that variable's field.

Figure 1A:
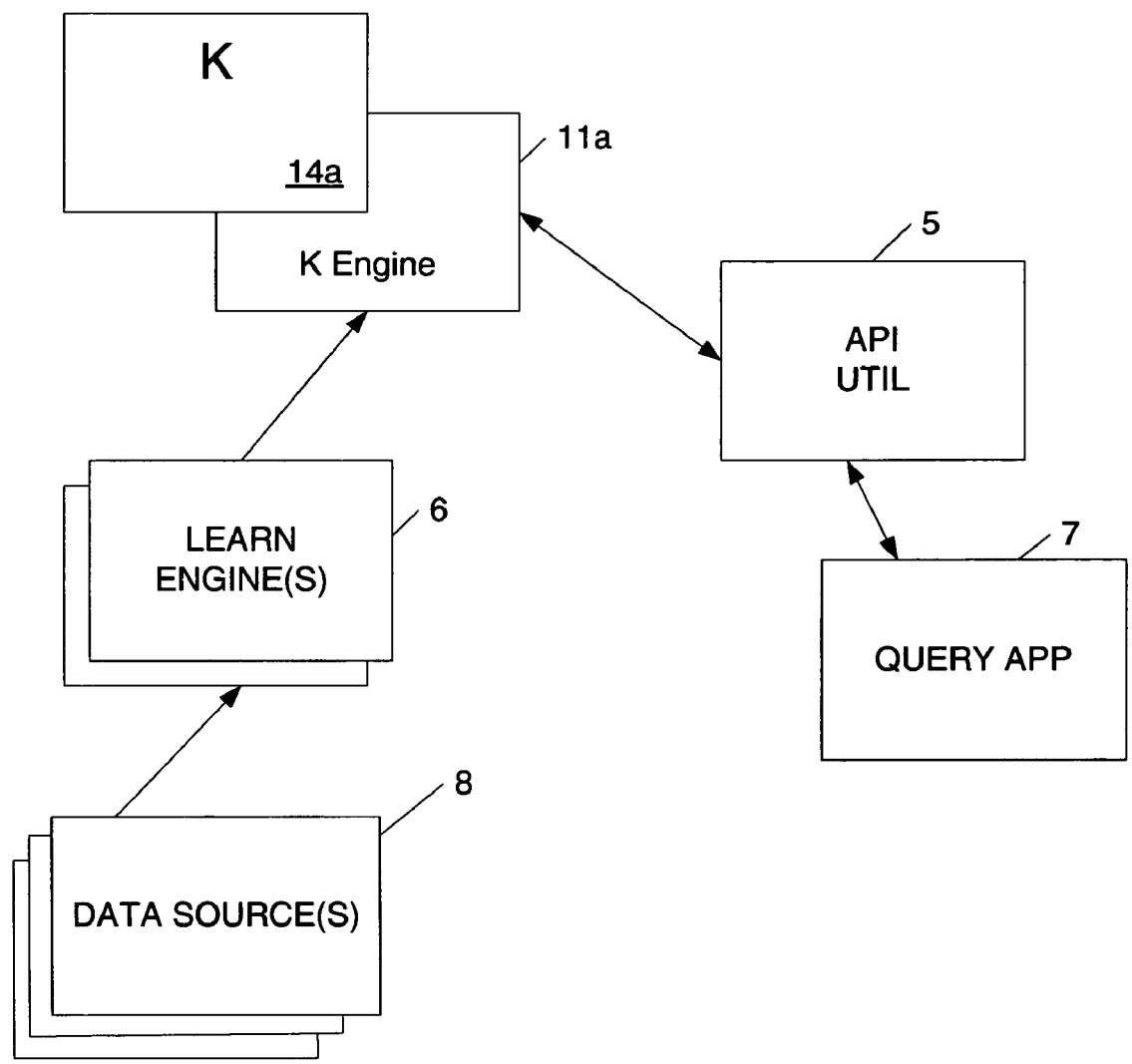
FIG. 1A is a block diagram illustrating an exemplary computing system in which aspects of the invention may be implemented having an interlocking trees datastore K in a computer memory (memory not shown) and components that support such a K in a system.

FIG. 1A illustrates a KStore 14a in a preferred embodiment environment in which a K Engine provides the only connection of the K 14a to the rest of the world. (It should also be noted that there can be more than one K Engine, similar to the one K Engine 11a in the illustration, providing access to the KStore 14a, although it is easier to see in an illustration using just one. We could also be feeding multiple KStores as well). In turn, the K Engine 11a is addressable by software entities such as API Utilities 5 and Learn Engines 6 (of which there could also be more than one). The Learn Engines and API Utilities manage and handle threads in cooperation with the resources of a computer system (not shown) in which they operate. (Typically, the computer system will be a server although we have used a single Personal Computer in some implementations of K.

The outside world, in our preferred arrangements has access to the KStore itself only through these API Utilities and Learn Engines, which in turn access the KStore through the K Engine. The API Utilities and Learn Engines, are accessed by the outside world through an applications layer. Software applications such as GUIs, databases, and any other type of program or interface which could provide data or request information can be hosted in this applications layer. FIG. 1 illustrates this same structure but is drawn to avoid the explicit delineation of threads and layers, to indicate to the reader that the hosting environment is inherently flexible in its nature.

The applications layer will have the various data sources 8 and the query applications 7 that use the just described systems to access and use the KStore 14a. This applications layer can be distributed across the internet or a local network, or local to the computer system in which the K is present.

Calls themselves, that is, the requests from the Learn Engine and API Utility objects can be very simple statements or even instruction words. The quickest way to see this is to illustrate it as an instruction word or message 34 of FIG. 2. As such (we use the concept of the instruction word for purposes of a teaching illustration) the instruction word could have an instruction type (Call) 35, but in most embodiments this is not needed because the K Engine will return a current location pointer regardless of the purpose of the call. The message will preferably have a switch component 36, but in many embodiments, switches can be set for the K Engine elsewhere. The message does require a data particle 37, suitable to be brought into relation within the KStore. By this suitability we mean that the particle must be something the particular KStore can recognize. In other words, if the KStore is only able to understand ASCII text particles and the information in the data particle section 37 of the example data word 34 is not an ASCII character, there will be an inability on the part of the instance of the call handler spawned to learn this particle to accomplish its task, and the call handler should generate an error signal to return to the Learn Engine in such an instance. Likewise, if the API Utility sends a request to find a particle in said ASCII-based KStore that is not in ASCII, an error indicating something like "not found" would preferably issue, responsive to such a request. (A further discussion of particles qua particles, characters, pixels, or other quantum-like components of information is found elsewhere within this document). Still using the instruction word analogy, the message to the K Engine should also have a return address section 38 that indicates the source of the request. This will preferably be generated by the Learn Engine to indicate that the acknowledge or error signal should be returned to it (along with some kind of trace so it knows which particle in a particle stream caused the error). If the call came from an API Utility, the return address section would be used to track where the API Utility got its query from (i.e., from which thread and where among the parts to this thread this call came) and to which this call is a part of the solution. (By part we mean that it may be a focus particle or a constraint particle to be used together to solve the query, or part of some larger query requiring several constraints or foci.) Finally, we should have a pointer 39 included in the instruction word 34. This pointer 39 communicates the current location in the KStore. The first particle in any new KStore will have a null pointer. This null pointer will be interpreted by the K Engine as a call to initialize, i.e., set the current location counter to the BOT node.

The Learn Engine basically provides an interface and translation and particlization functions to enable the K Engine to receive particlized data to learn. Thus it must be able to process appropriate protocol, transport, and translation capabilities to receive input from the expected data sources, whether they are XML, Oracle, DBMS or whatever, whether they are from static or streaming sources or even external event-triggered real-time sensor sources. Of course the particular embodiment may be geared to any subset of such inputs. It needs also to be able to translate the data from such sources into appropriate sized chunks of data that can be readily particlized to fit with the expected data particle formatting of the KStore, and it should have a particlizer to send such particles to the K Engine, and any buffering as appropriate may be added.

As should be apparent by this point, and well understood by readers in these fields of endeavor, each of these functions and components can be distributed across the computer systems and networks as desirable to effect the most useful form for the particular application the user may be building or use to which the KStore will be put.

Figure 3A:
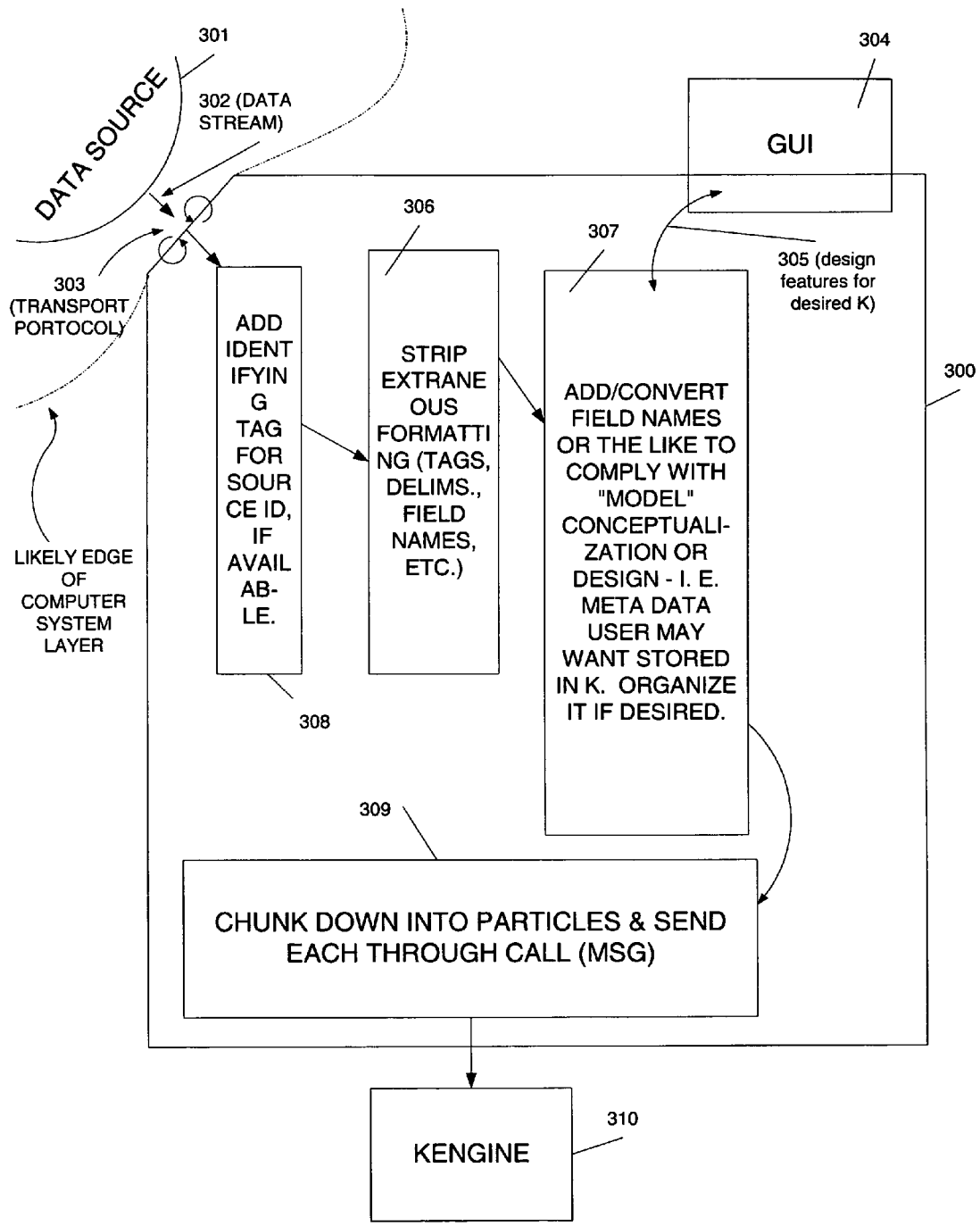
FIGS. 3A and 3B are a block diagrams illustrating Learn Engine and its components in two preferred embodiment forms.
Figure 3B:
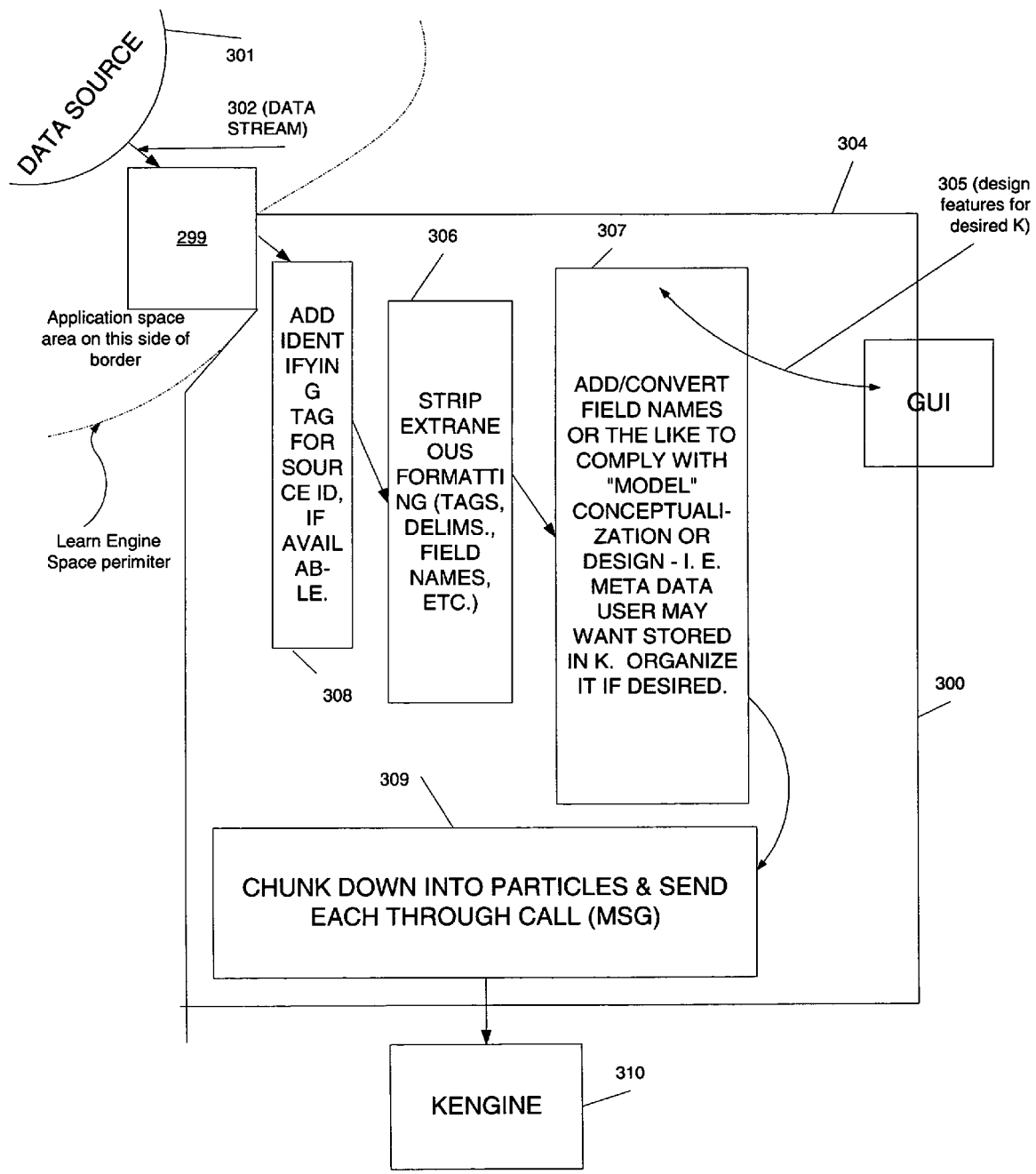

Refer now to FIG. 3A in which a preferred embodiment of a Learn Engine 300 is illustrated, handling a stream of data 302 from a data source 301. The data stream is received through a transport mechanism with associated protocol, in most cases probably from an external source computer system (not shown), across a communications medium (not shown) such as the internet or a local network to the computer system (also not shown) in which the Learn Engine 300 and the K Engine 310 as well as the KStore data structure (not shown), are functioning. FIG. 3B shows an alternative structure that can be used and how it functions will be described with reference to that figure below.

Assuming we are using the current invention, as a first step or matter, we preferably use component 308 to append some kind of column or field ID onto the information coming from the source identifying each new field variable within each sequence or record. There may be various ways to do this as would be understood by those in these arts, but in our preferred embodiments we prefer to associatge a field or column identifier with each new field variable from each record.

In a component 306, the Learn Engine will remove any extraneous formatting and protocol artifacts, and any tags, delimiters, and field names that are not relevant to the KStore being built with the data from the data stream 302. It can, of course keep such information if that is the desirable arrangement for the use to which this K will be put.

Subsequently, the incoming data will be subject in component 307 to a review of all Meta data about it that exists within the stream. In the case of the field record data stream of a preferred embodiment, fields that the user desires to keep identified will keep their associated metadata in a positional relationship to the data within them that the user has come to expect or want for this KStore. If a field name from a previous data stream that is going to be associated in the KStore with this new data stream came from a different database with different field names, the names may be changed at this stage in this component 307. Likewise, if a different kind of database was used in the creation of the KStore using the earlier data stream, the field name may come after rather than before the data in the other database, for example, so this arrangement should be mimicked at this component in order to regularize the data. There are alternatives such as creating a related structure within the same KStore by ignoring the differences, but it seems at this point to be efficacious to regularize the data streams, or, in other words, clean the data. Control over this data cleaning or regularization will preferably be obtained through a GUI 304, wherein design features that are desired 305 are conveyed to the component 307. Ultimately, of course, the field name or identifier will be appended to each field variable so that the column or field name can be found associated with the variable in the KStore.

Next, a final component 309 in the Learn Engine need only break the data into particles with appropriate pointers indicating what kind of particle it is, and to pass this particle itself, together with the other message features i.e. the current location pointer, needed to the K Engine 310 in the form of a call. In this step, one should notice that the particle stream will have (preferably) first a field name, number or other identifier to identify the field variable that will follow, then the field name delimiter, then the particles that make up the field variable, then a field delimiter, then a next field identifier (taking however many particles it takes to identify it), then the field name delimiter, then the field variable for this next column, and so on, until the record is completely particlized. From here, the particles are sent to the K Engine to be recorded as events in K. Note that the field name delimiter and field delimiter can be the same character or a different character, and in less preferred embodiments one or both of them may not be included.

As should be apparent by this point, and well understood by readers in these fields of endeavor, each of these functions and components can be distributed across the computer systems and networks as desirable to effect the most useful form for the particular application the user may be building or use to which the KStore will be put.

Another preferred embodiment, a variation of the Learn Engine example of FIG. 3A is in FIG. 3B. This figure uses the same numerals for the same structures as does FIG. 3A. However, in this embodiment, we add a component 299 that is outside of the space for the Learn Engine 300. This component 299 receives the data stream 302 from the data source, and it provides an additional layer of flexibility to the system. It may be an ETL (Extract, Transform and Load) component, a filter component or other mechanism to evaluate the incoming data stream and make desired changes to it such as eliminating or modifying certain variables, fields, delimiters or the like, parsing XML into data useful to the particular KStore need identified by a user of the component and Learn Engine, and, most importantly for this invention, adding in information for each field in each sequence or record from the repository or data source into the data stream that the component 299 will forward to the Learn Engine 300. Most preferably, the component 299 itself will incorporate such an ID into each field of each record or sequence received from each source. There may be and preferably is a different value for each repository ID that corresponds to each different data source so that a given data source will have a unique repository ID, and this can be used to determine the names or identifier for columns from each such repository. The Learn Engine transport protocol would then treat the output from component 299 as output received from a message queue or named pipe. Thus, the field name schema corresponding to an ID for the source will be incorporated into each record sequence sent as particles by the Learn Engine into the K Engine 310. Note that the component 299 is in the applications space rather than in the Learn Engine space. This is relevant because it allows for it to be more easily controllable or configurable via applications and application developers. Thus, the configuration as to what data may be desired (or not) from the incoming data stream and how to accept such data, as well as how to organize the data before sending it to the Learn Engine, and the other adaptations we discuss, can be configured by the application, the developer, or the manufacturer or distributor in a predetermined or dynamic way, as may be desired for the given instance.

There are a number of things that can be done using a piece-like component 299. For example, if the external world wanted to time stamp all data sequences it was inputting to the KStore, it could do that in such a component by adding in the time-stamp data. And not just time, but contemporaneous sensor data input could be used to identify for example at what temperature a data record was sent for recording. Such added data would preferably be characterized as being in a new column, thus getting its own identifier associated with it as it is incorporated into the data particle sequence for the relevant record. The flexibility added by the addition of component 299 is quite remarkable, and not just for historical data analysis. If, for example, the KStore was functioning as an intelligence charged with responding to specific conditions, the relevant conditions could be affected by time, temperature, or whatever, coincident with the incoming data sequences that happen to have specific data in them. The KStore would be enabled in this way to know when such conditions are in existence using this component 299 as an integral part of the system.

Likewise, a plurality of Learn Engines could operate simultaneously with respect to a single K, and each Learn Engine could supply a source ID for each source it receives data from, which could be used to determine column identifiers for all data records from such sources. The records from the various sources could thus be supplied with Learn Engine particles send to a K Engine for that single K, without any change in procedure or structure from what we discussed above, so long as one coordinated the identity indicators for the sources to ensure that column identifiers corresponded to the same columns across sources.

There are numerous ways to accomplish the appending of the ID for the column on the incoming data stream, and we do not intend to limit the creativity of the reader in assuming that there are only a few, but we describe herein our preferred embodiments. We could set up an intermediate data structure from which we read records having the records organized to concatenate the field names with field variables. Typically, a data base will be readable with delimiters between records, and each record will be in a particular column order consistent within the database. Knowing that we are at a next delimiter informs us that we are at a next column, so it is an easy step to recognize that setting up a list of column names (or numbers) and incrementing our way through the list at the appearance of each delimiter would be a solution to this problem of associating the field or column names or numbers with the incoming data stream.

Referring to FIG. 14, a preferred embodiment generalized process 340 by which the Learn Engine functions is illustrated in flow chart form. First the data source is synchronized 341 with the Learn Engine. Various protocol functions, establishing a transport mechanism, security features and the like are handled during this phase. As should be well understood by those of skill in the programming arts, one would prefer to have a mechanism for establishing the protocol for communications between the data source and the Learn Engine to allow the communications between the Learn engine and the data source to occur smoothly. Such a subcomponent would have signaling functions that would be established so that the data could flow into the Learn Engine from the data source, preferably without interruption. Once protocol for synchronization of communications is established, the data can be transmitted in a data stream 342. At this point the data can be received 343 through the established transport mechanism. It is at this point that the Learn Engine's functions relating to establishing appropriate data messages for the K Engine occur in step 344. In this phase 344, the data is organized into the format that the K will learn it 345, and the metadata as well as delimiters and other protocol or metadata features will be adjusted as needed 346. At this point the data stream is ready for particlization 347.

The Learn Engine can then test 348 an indicator to determine if the position of the particlized data in the stream is important. If the indicator is not set 348, the Learn Engine sends the particlized variable to the K 351. If the indicator is set, the Learn Engine concatenates 349 the particlized field identifier and a delimiter symbol (such as ':') (assuming that a delimiter addition is set as well or that such is the default) to the particlized data sequence between each field variable, in effect, inserting the field identifier into the particle stream along with the delimiter. (It is not necessary to use a delimiter, especially if the field identifier is known to be easily distinguishable from the variable data for the field). The Learn Engine then updates 350 the data records with the new, concatenated data. Once the records are updated, 350, the updated, concatenated data is sent to the K. It should be noted that delimiters and other metadata such as field headers or record number indicators ordinarily will be particlized as well for the field/record universe of data streams. This permits knowledge of the structure of the original data to be learned along with the data. Generally, this is the flow of how this proceeds but as the reader looks through the illustrations of example data, it will be apparent that there could be many similar algorithmic processes by which one could set up the data to be particlized with the field identifiers inserted between the field variables. It may be noted that in order to efficiently process new particles, particularly for establishing tables, where there are branches from particular nodes, the Learn Engine may submit location pointers for a previous to last position as the last position when it is creating a next message for the call with the next particle. To see this, look at FIG. 7. At the node labeled Bill Monday, there are two subcomponent nodes which follow it, using Bill Monday as Case definitions. They append either 103 or 100 nodes. This is called a branch. If the Learn Engine knows it is going to have such a branch, it may save the location pointer to the Bill Monday node and re-supply it when it is supplying the second of the nodes 103 or 100.

Figure 12:
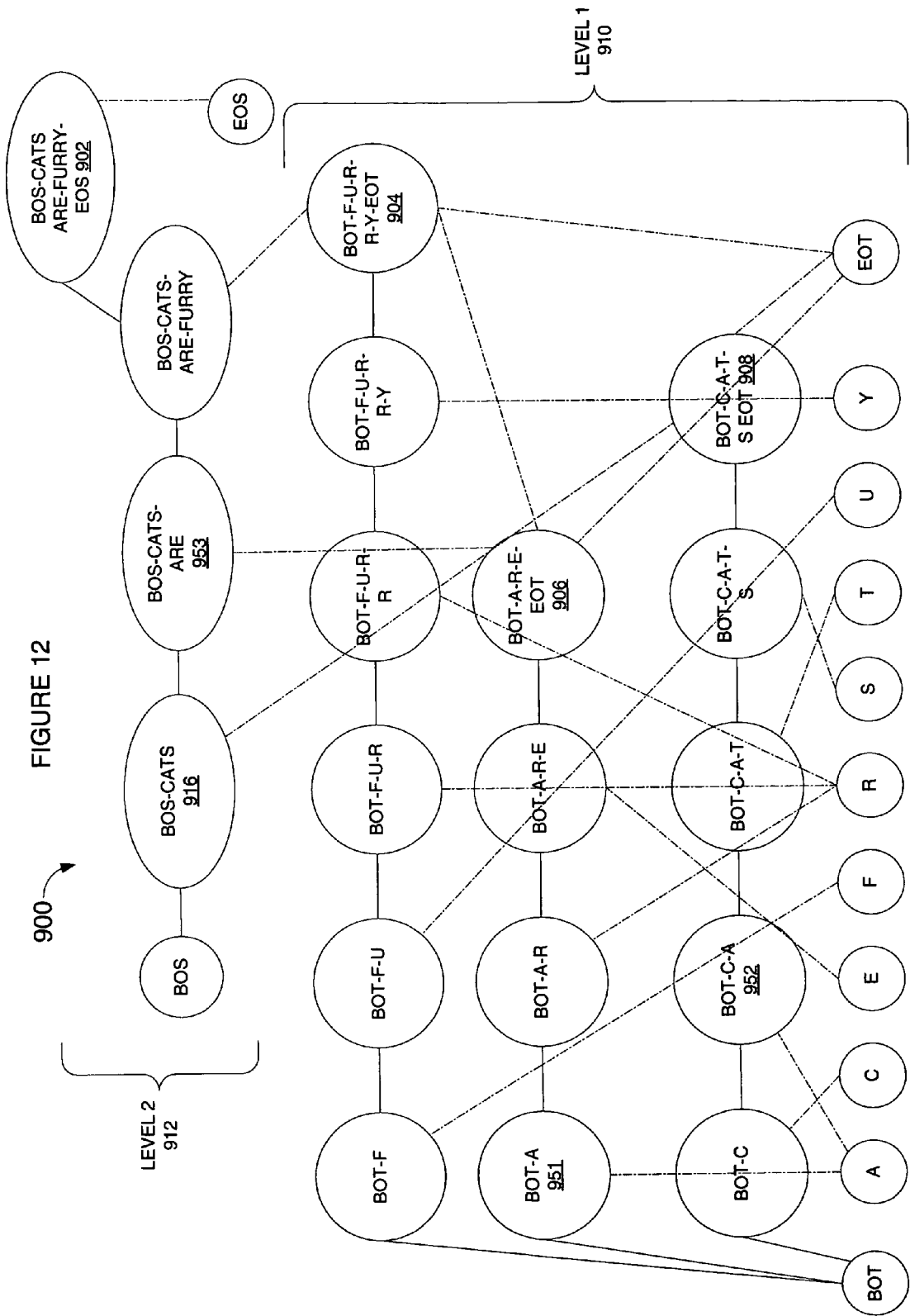
FIG. 12 is a node diagram of a KStore structure useful for discussion of particlization.

To be clear about particlization refer to FIG. 12. Note that in this K, it starts at a level of letters, and shows a second level of words. If all letters are "sensors" that is, they can be recognized as particles, adding each new letter allows for continued growth of the K. Submission by a data source would be by way of the three words in order, "CATS" "ARE" "FURRY". This K accepts letters as particles. Accordingly, the Learn Engine providing an interface to the K Engine for this K must produce letters as particles. A first particle is "C." The node representing this particle will be located within the elemental root nodes. To record this as an event the elemental root node for "C" will be brought into relation with the current location pointer in K, which in this case is the BOT (Beginning Of Thought) node. Because this is the first occurrence of "C", a new node will be created representing BOT-C. The next particle will be A, and it will be accompanied by a pointer to the BOT-C node. The K Engine will go through the asCase list and for each of the subcomponent nodes on the asCase list of the BOT-C node and for each node it will look at the Result node to see if it matches and use that subcomponent to reset the current location pointer. In this case there are no nodes in the asCase list and it will not have found a match, so the K Engine will record this event as BOT C-A, a new subcomponent node, and put this new subcomponent node on the asCase list of the original location counter. The new subcomponent's address will then be set as the new current location. More precisely, The K Engine will see that there are no occurrences of A following BOT-C in the current structure and that a new node will be required to record this particle event as BOT C-A. The next particle will be a T, and the record will be the new node presenting BOT C-A-T.

In our preferred embodiment Learn Engines, will reduce the size of data in the input data stream after stripping and adding and/or converting it in order to comply with predetermined information that is available to the Learn Engine through the initial set up processes. The Learn Engine should be established with a set of switches kept in its associated memory area and accessible to an application or application programmer that sets up the Learn Engine's functioning with the KStore and the K Engine it will be working with. These switches will have data regarding the datum sizes that are to be expected from the data sources it will be working with. This can also be handled in the protocol establishing step. In any event, the purpose of such activity is to end up with the size of the particle matched to said predetermined sensor information that the K Engine and the KStore it is working with will accept.

Switches can be used to establish column identities (names, numbers or the like) that will be used with particular data input streams, and determine how particularly they should be handled (i.e., what delimiter to use, what kind of data to expect and the like). In more aware systems, the switches or similar controls will allow the Learn engine to make its own determination of what identifier should be used whenever it recognizes that a field record data stream is being received.

In preferred embodiments, we have two types of API Utility components to the typical KStore system. One, an administrative API Utility component, is for maintenance, initiation, and change function support, which enables the user or a program to modify the various system components such as, by setting switches, state variables, designating data sources, modifying metadata or doing other things of an administrative nature. These settings that may for example control the functioning of a K Engine responsive to particles that may be on its sensor list. One such example could be designating certain particles as delimiters where a K Engine is expected to be responsive to a Field/Record universe of data. They may enable the user to initiate a second K Engine for accessing a single or more than one KStore within the system. Another function that may be handled in this way is the establishment of form and meaning for metadata in an input data stream or in a set of queries from particular query sources. This administrative API Utility type may be used to name particular KStores, to save them to long term storage, to return them to active system memory, in short, to accomplish any function other than the actual particle by particle message passing call operations of the system or query resolution. An illustration of a preferred embodiment of this administrative API Utility is pictured in FIG. 13 The other API Utility type is used for queries, and is not illustrated.

Figure 13:
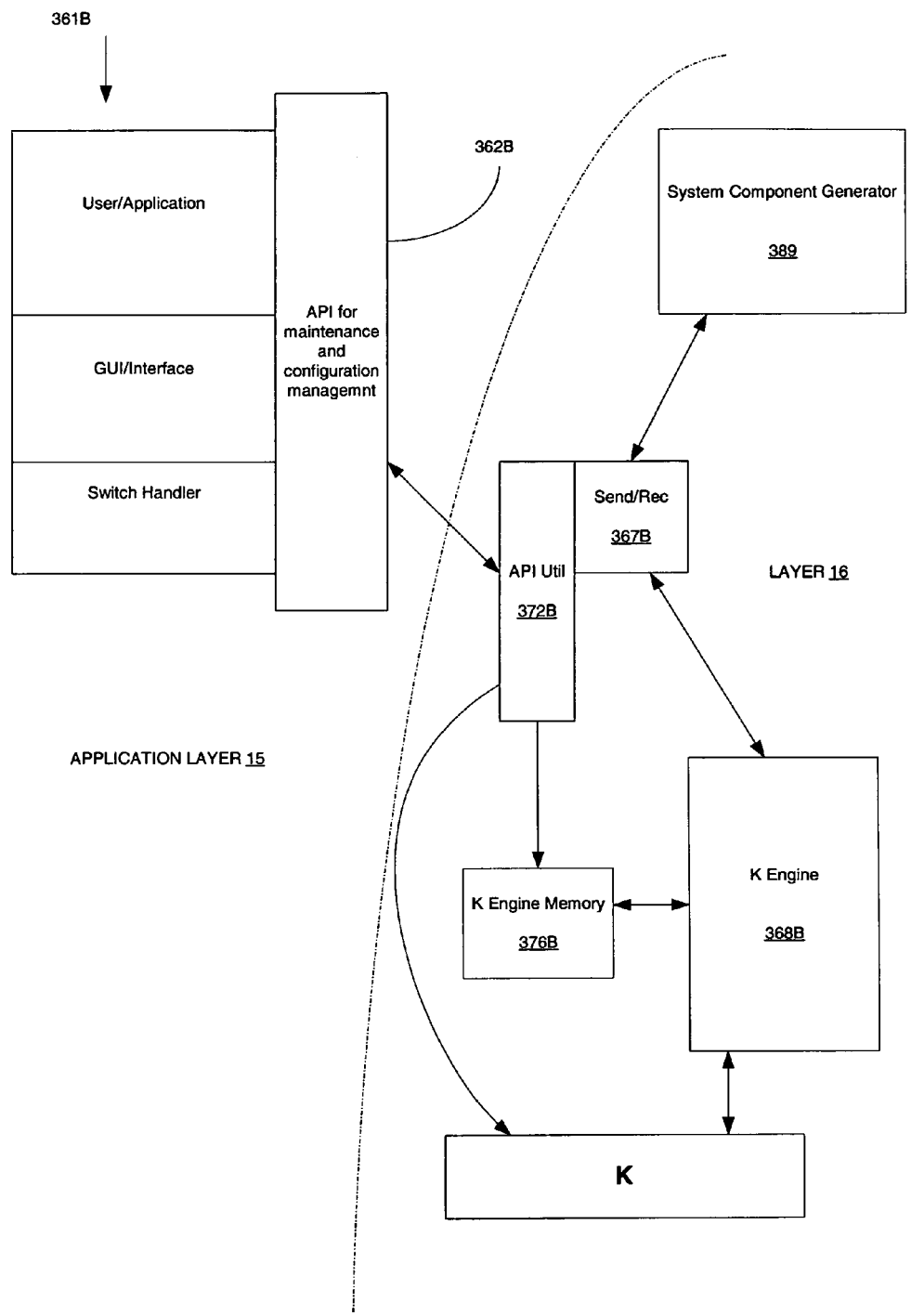
FIG. 13 is a block diagram of components of a KStore system.

In FIG. 13, the user or application that needs to adjust or initiate processing in the KStore system will access the state variables of interest through an interface 361B. In fact, the builder or user of the KStore system we describe here may build nearly any kind of interface structure in the applications layer he wants to. The only critical requirement in the applications layer 16 is that it communicate through an interface such as the API 372B which provides multiple routines to access the KEngine, K Structure and associated memory areas. One would expect that the arrangement of applications layer components would include a Switch Handler which will process these requests as needed, interpreting them appropriately for the system under consideration. For example, if a system is established with some number of different default settings to be set into an instance of a K Engine or K Engine and KStore combination for a given set of threads, a single command through the GUI or other interface may be used to choose the default most appropriate for the user's or the application's needs. Thus, the application will handle communication of this set of state variables to the API Utility segment 372B, which will make appropriate changes in the state variables and the like in the K Engine memory 376B or in K (and/or in K's associated state memory, not shown).

Figure 1B:
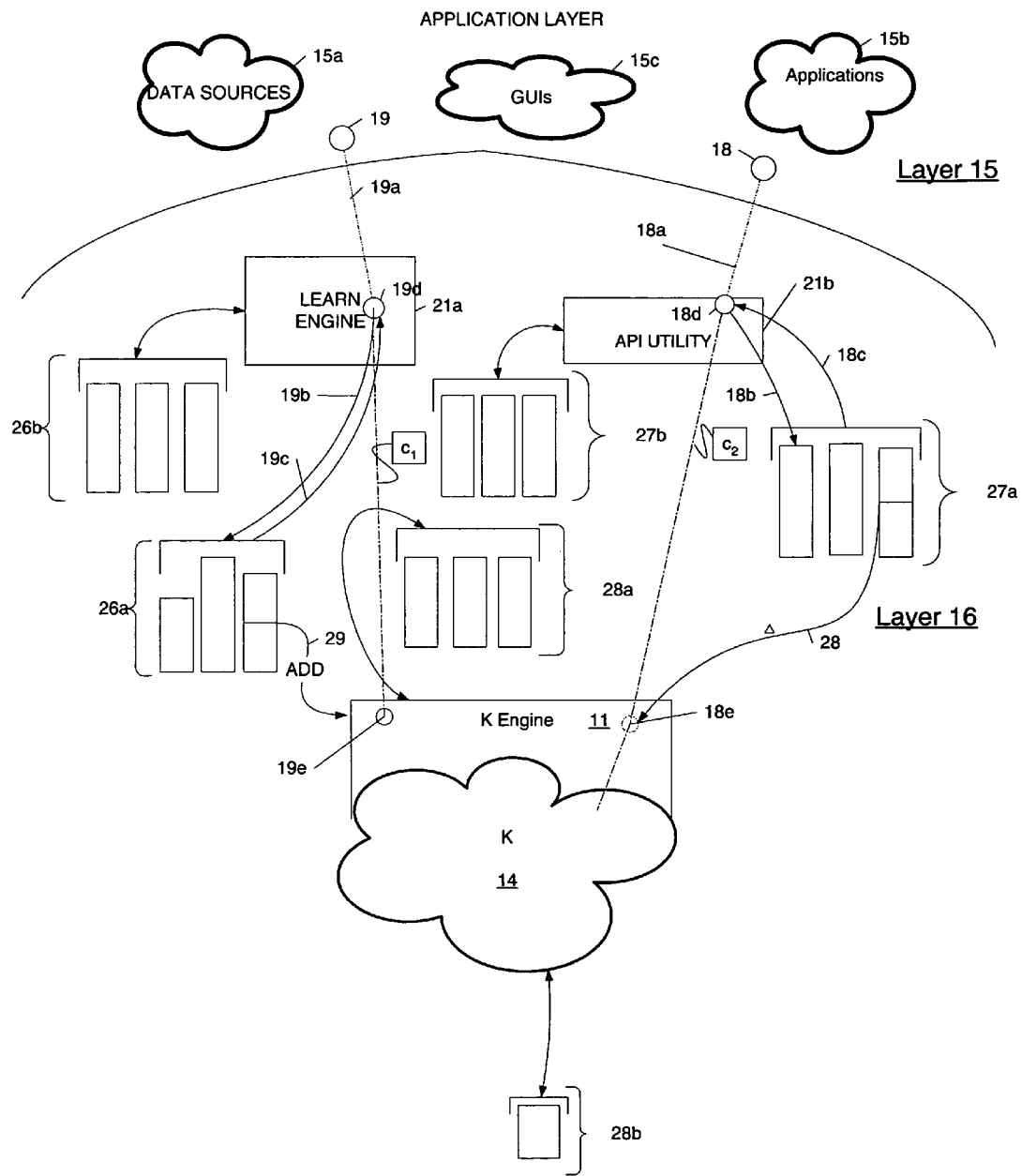
FIG. 1B is a block diagram illustrating processes used in a learn function in building a KStore interlocking trees datastore.

Additionally, it should be noted that the administrative routines of the API Utility of FIG. 13 will also (preferably) be called upon to instantiate the K Engine and set up the basic parameters used in the one or more KStores and that this K Engine instantiation will be called upon to build and/or access the K structure. The Utility segment together with the send/receive subcomponent will have the addresses and other information needed to contact a K Engine instantiator object, here illustrated as a System Component Generator 389. In this instantiation process, metadata such as what data in a particle is to be defined and operate as a delimiter, whether the Learn switch is to be on or off, and every relevant configuration variable will be established. As there are a vast number of ways to do this, after the understanding of the KStore system conveyed herein, the reader of ordinary skill in the programming arts will be able to put such ways into effect without undue experimentation and with relatively little programming effort or thought. In FIG. 1B, layer 16 is a layer that contains at least one instance of API Utilities and/or a Learn Engine 21b/21a. We can simply call an interface object since for the features shown in this diagram, it functions similarly for both types of interface objects. This object contains or is the set of programs that enable calls for information or data input 19, 18, to address K regardless of the form they are in. Calls to this object Learn Engine 21b or API Utility 21a, initiates a thread, threads 19a or thread 18a, respectively. This thread may supply a continuous or a discontinuous stream of data to the Learn Engine or contain the parameters of a query for the API Utilities. The programs in the software object 21 set up a data storage area 26, 27 in memory (preferably on the server, thus in layer 16) to accommodate the processing needs of the thread 19a, 18a, respectively. The threads are given "cookies" or keys C1, and C2, respectively, which enable them to access the memory areas. Such access of thread-controlled memory areas is accomplished using reentrant code of the software object 21a/21b which has routines 19d, and 18d, respectively. These routines will enable passing address, pointer or other particle-related data to the thread into or out of the data storage areas 26, 27 as the thread executes. Thus, in the case of the Learn Engine, pointer addresses indicating where in a sequence the location pointer is currently for this thread, a list of pointers to all sets of relevant nodes, and information of that nature are stored and accessed from the memory areas 26 or 27 as the need arises. The data in memory areas 26 and 27 are thus used to drive the activity of the K Engine 11, in that they help the K Engine construct an action to place a new event or find an existing event within K. Based on the result of the activity of the K Engine, the API Utility routines may add data (using reentrant code 19e to update the data 29 in data storage area 26, or change some data already in the data storage area 27 (using reentrant code 18e with the changes in the data 28)). In other words, we are passing the address of the data storage area around, so we can update the data directly. That's not to say that one could not have a separate piece of code associated with such data transfers/modifications whose sole job is to manage the storage area.

Generally then, the threads are created by the appearance of new data being sent to a Learn Engine or a query asking for results from an API Utility handling such requests. In the case of the Learn Engine 21a, managing this thread creation requires the allocation or establishment of memory resources 26a and keys or cookies C1 so that the thread will have access to these established memory resources. In the case of the API Utility 21b, it will also establish the memory resources 27a and keys or cookies C2 to manage the query thread and to guide its operation between the K structure 14 and the K Engine 11. The K Engine will handle the events in the realm of K 14, producing a current location pointer, which can be used by the API Utility to traverse KStore and answer the relevant query or part of query the thread is working on. One of ordinary skill in the programming arts is familiar with the concept of threads and how to have various objects create them in a computer system responsive to program-generated signals and/or data messages and the like, so no further discussion about how to accomplish this using threads is required. Likewise, it will be readily understood by those of ordinary skill in the programming arts that such a set of processes can be created in nearly any modern programming language without any difficulty, and that there are numerous ways to do so.

These memory resources 26a and 27a allocated to threads 19a and 18a, respectively, provide places that the Learn Engine and the API Utility can buffer and manage intermediate processing. Such intermediate processing may be needed to satisfy the function of the Learn Engine and the API Utility in supporting the activities of the threads. In the Learn Engine, memory area 26a would be used to hold data being particlized as a buffer while the Learn Engine functions to separate and manage each particle as needed. The memory area would also provide space to maintain pointer lists for determining which particle is being sent to the K Engine currently, and the relationship, structure-wise of this event to the data stream being input from the data source. Lines 19b and 19c indicate a path between the thread's reentrant code segment 19d and the memory area 26a which controls the particlizing process, allocating particles and any other needed parts (if any) of the incoming data stream to the memory area. Line 29 facilitates the entry of the Learn Engine's particle data as a part of the message carried to the K Engine by the thread 19a, at section 19e, In here, the K Engine 11 processes the recording of the event in K 14 and returns the current location pointer to the Learn Engine. (Thus, in the drawing, thread 19a may not continue into K itself, unlike thread 18a, which in some circumstances described below can, without going through the K Engine).

The API Utility-related thread 18a would use its memory area 27a to enable the same kinds of functions in a similar manner, supporting thread 18a's activities in making a query, using the resources of the API Utility 21b. Again, a key or cookie (C2) would preferably be provided for the thread to manage its access to the memory area 27a. Again pointer data and data related to the thread's activity, in this case an inquiry of K, are stored in area 27a while the processing of the thread is unfolding. Here, data is returned, in the form of memory location pointers or addresses along line 28 from a piece of reentrant code 18e that the API Utility routine operates with. The management of the memory area, which can be quite complex for a complex query, is handled through reentrant code 18d and communications pathways or messages 18b and 18c.

Note too that in preferred embodiments additional memory areas are allocated for the K engine (area 28a) and for the KStore (K 14) itself (area 28b). Use of such memory areas are preferable to support functions such as switches to determine the various states and conditions for the K Engine and the K structure itself as the API Utility routines determine how to respond to queries or additional data input, whether to learn it or not, and for various features that might be program controlled. For one example, if we have two K Engines, both accessing a single K, the memory area 28b would be used to lock K so that it could learn a new event. For the time K is locked, only the K Engine having access to it (or the part of it that may be locked) could alter that K (or that area of K). Memory area 28a would be needed to store information related to the abilities or configuration of the particular K Engine that uses it. As the reader becomes familiar with use of K and K Engines, additional particular uses for such memory areas may become apparent, but at base, it is most useful to have a dedicated memory region to store each K's state and the state of any universal property switches that may be in use, and a dedicated memory region for each K Engine's state and the states of any properties that will be used by any set of threads.

Generally, the threads will produce calls from the API Utility and the Learn Engine to the K Engine to effect the learning or the query. The K engine processes 'particles' and returns the current location of the K location pointer to the caller. If the 'particle' sent is recognized, the K engine will try to record the event by moving from the current location of the K pointer to a location on K that has recorded this event before. If there is no past record of an event equivalent to this, new K structure will be created to record the new event. If the 'particle' sent is not recognized, the current K pointer stays the same. In a preferred embodiment, the K Engine will ignore the event as 'noise' and the calling routine will have to decide how to process this event. However, at some point the K Engine might "decide" based on a switch setting to send an error message or to create a new sensor, or perform some other task, whether it be communication to another component or sending an Email or modifying its activities with respect to K. Switches or modified K Engines can enable endless such activities, as the imagination of one of ordinary skill in these arts can easily conceive.

It should be noted that switches can powerfully affect the K Engine performance and allow for control over its configuration. Specific switches we have used include at least one for Learn (Y or N), Column numbers or other identifiers (Y or N), Meta Data field names used instead of column numbers (Y or N), EOT levels (Number and names), EOTCOL (column name), EOTVAR (variable), EOTFLD (field entry), EOTRCD (record). One of ordinary skill in these arts will recognize that this list is far from exhaustive and that different switches will be created for different uses for the KStore. For example, a host of switches may be set up for a KStore that stores images, relating to pixel information. The switch for whether column identifiers are to be handled by the Learn Engine are basic to the functioning of this invention and are checked in preferred embodiments at query 348 of FIG. 14.

In FIG. 4 we illustrate a data set of fifteen records using the current art from two salesmen, Bill and Tom, covering something (100 or 103) that was either sold or subject to a trial in PA or NJ on Monday or Tuesday 400. Although this data set is simple in nature, its objective is to show how column information can be lost when the K is built if the particles of data from different columns are the same. FIG. 4 contains data with columns containing dissimilar data, i.e. no two columns will be the same. It is a rather small sample of the kind of data one finds in Field Record universes of data sets, but it is adequate to use to explain our invention.

Figure 5:
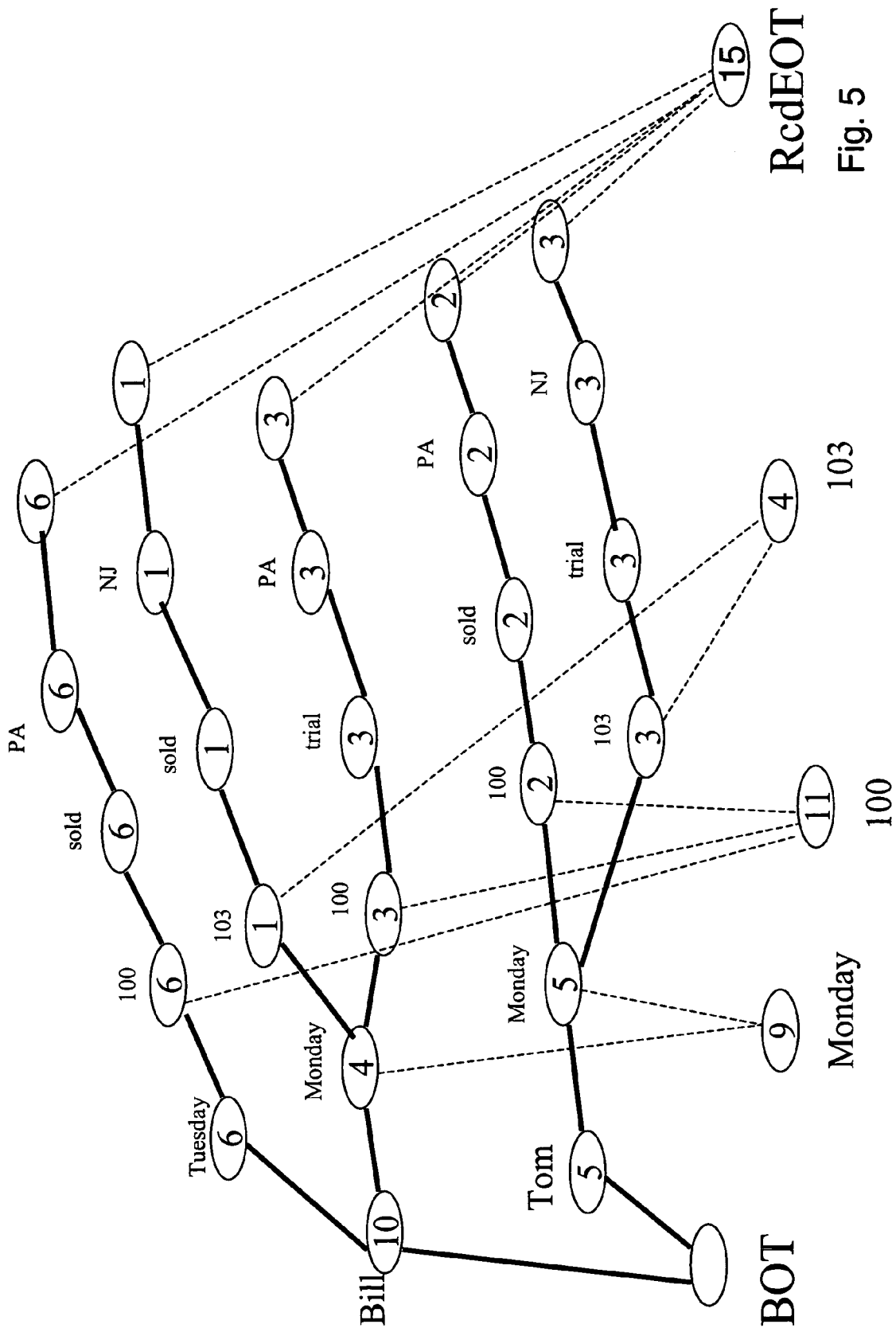
FIG. 5 is a node diagram of a KStore built from the data of FIG. 4.

When fed through a KStore KEngine, as illustrated in FIG. 1, this set of records will be represented in a KStore (or "K") in a way that comports to the diagram of FIG. 5. The asCase links from the node (illustrated by an oval) at BOT point to Bill and Tom, each of their nodes containing a count 10, and 5, respectively, that indicates how many records there are of Bill and Tom, again, respectively. There are 9 Monday records, and a root node "Monday" has that value in its count field, illustrated here by the number in its oval. As seen in the count field of the record node RcdEOT (end of record node) there are a total of 15 records in this diagram.

As will be familiar to those who have seen KStore interlocking trees datastores before, these diagrams will be familiar. They have a pointer from each node to a next node in the asCase (BOT to EOT direction) and a pointer to the asResult that each node is a one of (i.e. to its root node), thus the KEngine forms a set of trees from the asCase and from the asResult sides which are interlocking. We have detailed how this is accomplished in earlier filed patents which we identified in the background section hereof, but no further information is needed to understand this invention than this brief description for the native structure of a K.

Figure 16:
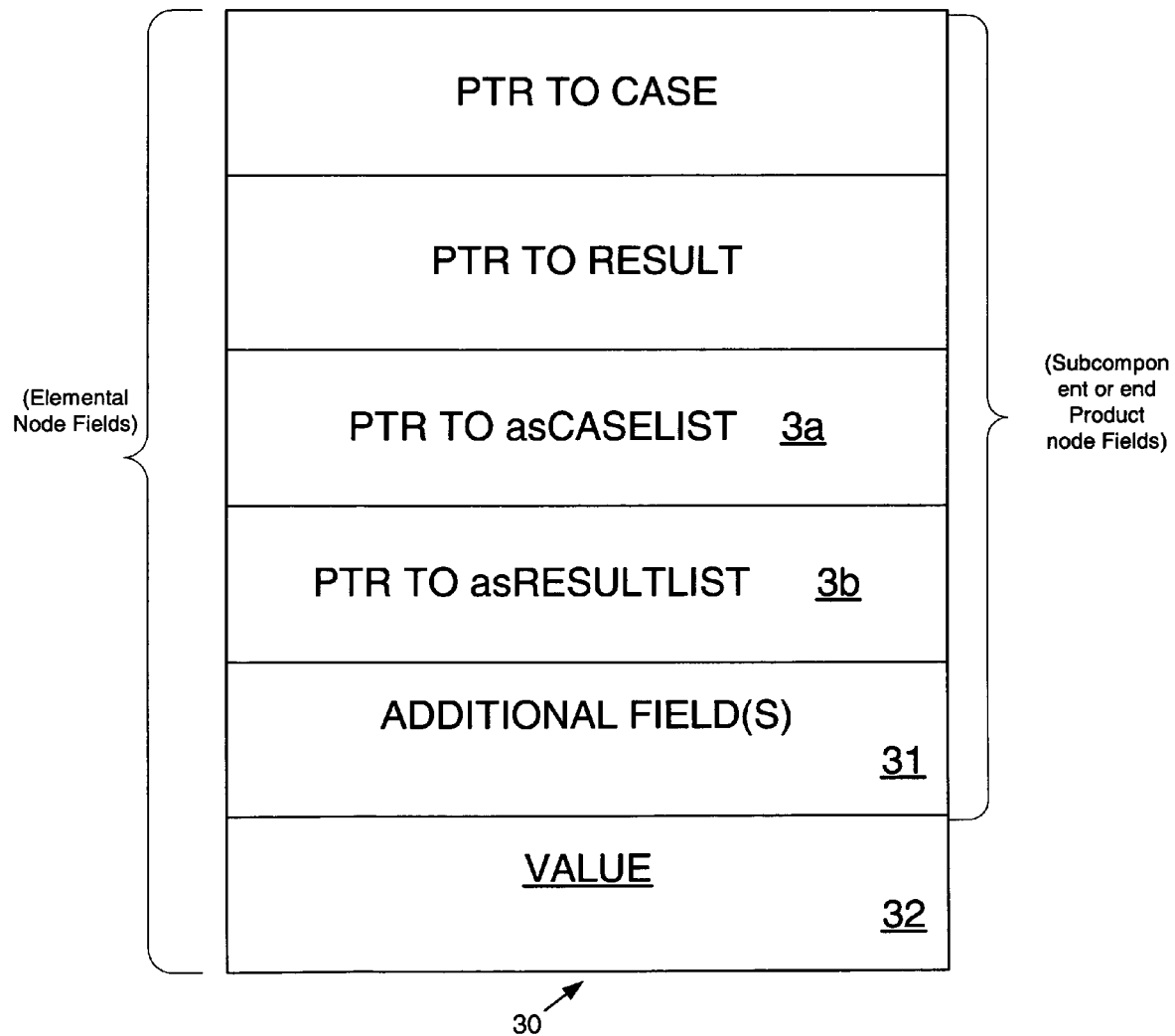
FIG. 16 is a block diagram of a generalized node data structure.

The nodes in the structure will typically have a form as illustrated in FIG. 16 which illustrates the data fields of a typical node 30.

This node 30 may include a string field, as the additional field 31, that contains a sequence that shows all of the elemental root nodes represented by this node. The addition of a string field including this sequence of elementals is helpful in debugging. There can be many uses for such additional fields and the nodes such as node 30 need not be limited to one additional field.

Further, recognize that the pointer the pointer to asResult list field 3*b* will be null for all subcomponent nodes and that the pointer to asCase List field 3*a* will be null for the elemental nodes and endproduct nodes.

The exemplary node 30 may also include a count field as an additional field 31. The count field is initialized and incremented with an intensity variable, whose value varies with conditions at times when the count field is being referenced. (An intensity variable is defined as a mathematical entity holding at least one unchangeable value). By making this term so broad the intensity variable populated count field can be used for applications of the inventive interlocking trees structure to processes dealing with forgetting erroneous recorded data, recording which entity is doing the inquiry, recording the type of inquiry being used, and other processes of interest which may be derived when using the data. A simple example form of an intensity variable would be a single ordinal field value, such as '1' to be used to increment or decrement count fields to record the number of times that a node has been accessed or traversed. If the node were an elemental root node it would also contain a value field 32. Most of this node construction is already discussed in prior applications U.S. Ser. No. 10/666,382 and Ser. No. 10/385,421, incorporated by reference above.

A second data set using the previously taught method is provided in FIG. 6. It identifies the salesperson, day, item number, disposition and price. The reader should note that the columns for price and item number can contain the same data, though in different contexts, as illustrated by this Figure.

Figure 7:
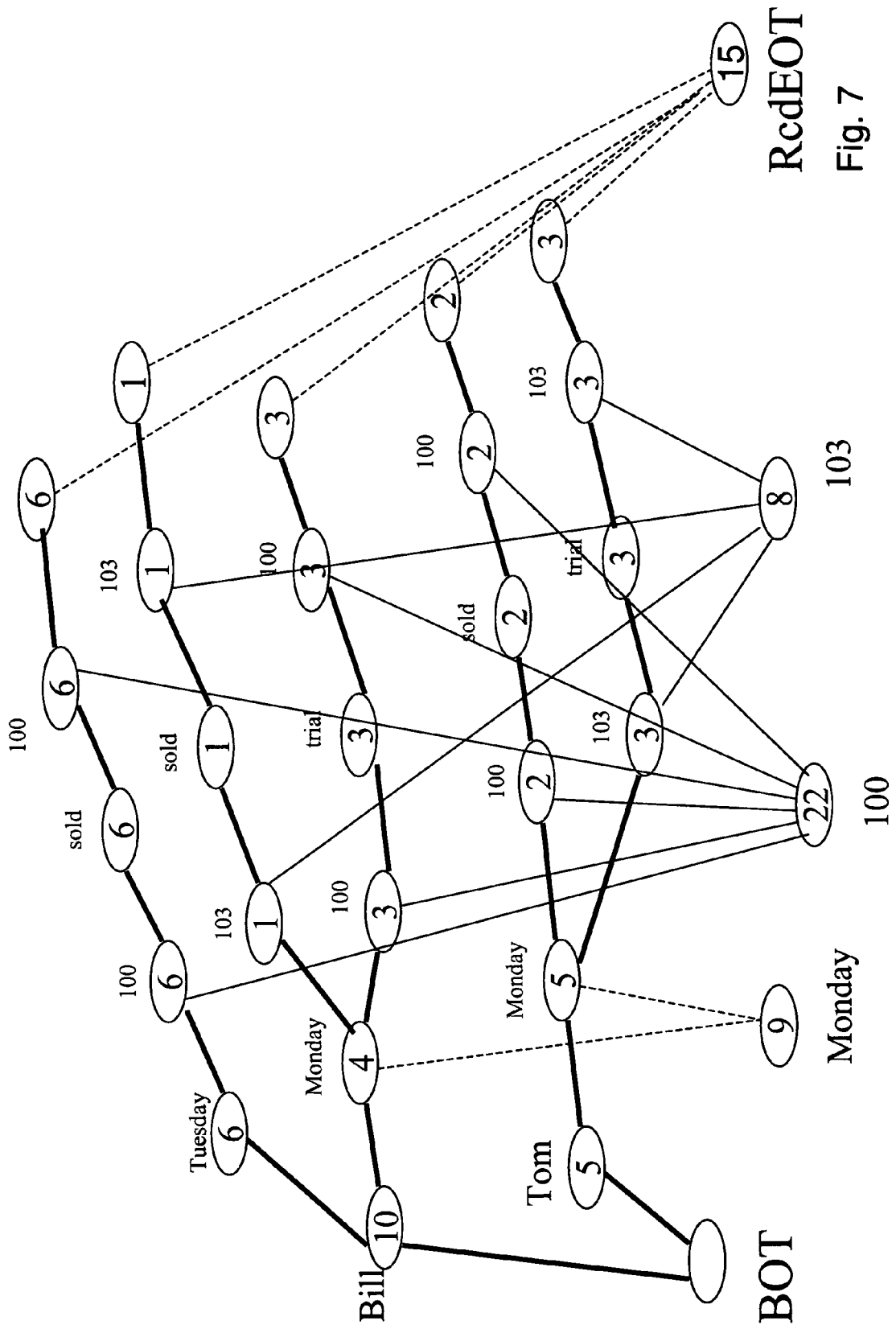
FIG. 7 is a node diagram of the Kstore structure developed from the data represented in FIG. 6 as taught by the prior, co-pending applications.

FIG. 7 is a Kstore structure developed from the data in FIG. 6. It should be noted that the root nodes for both '100' and '103' account for both the price and item number data columns. The count field in the root node for '100' suggests that there are 22 occurrences of '100'. Though this is true, it cannot be quickly determined how many occurrences reference an item number '100' versus a price '100', without performing a subsequent analytic on the K using focus and constraints.

FIG. 8 is the same dataset as in FIG. 6, but has been updated using a preferred method of the invention. The column numbers have been concatenated onto the data with a delimiter, which could also be called a spacer ':'. A person skilled in the art of databases should appreciate that although the dataset shown is ordered sequentially by number, depending on the number of data sources and the order data is received, the data may not be ordered or labeled as such and we may have the learn function adapted to particlize the incoming data so that it is sent to the K Engine in particles in a serial stream that the illustration could create, reading from one character to the next, right to left, then down, then right to left again.

Figure 9:
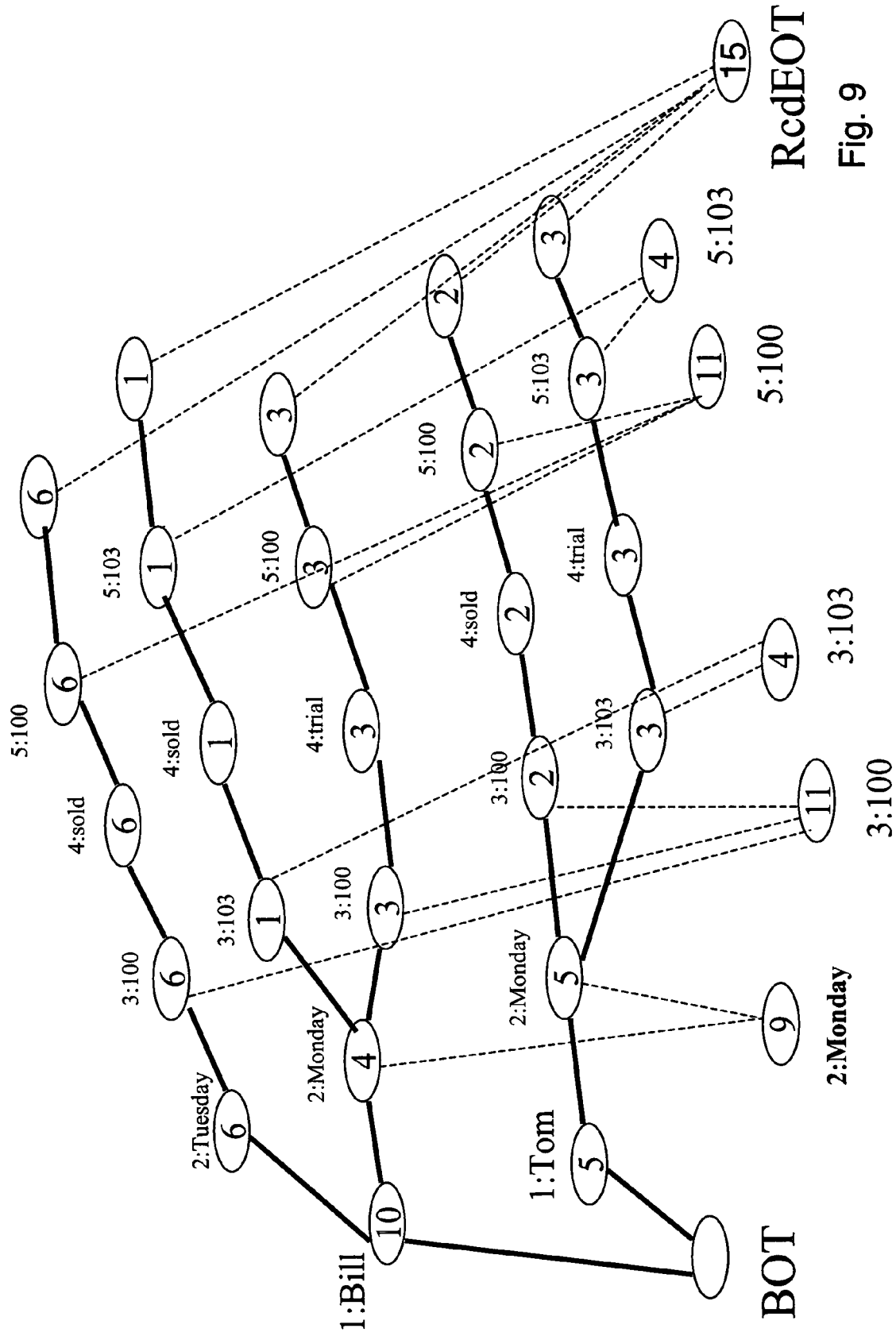
FIG. 9 is a node diagram of the Kstore structure developed from the data of FIG. 6 as represented in FIG. 8, employing the preferred method of the invention.

FIG. 9 is a K built from the data in FIG. 8. Note that although the subcomponent nodes, or Signnode, structure of the Kstore is unchanged from FIG. 7, the root nodes for the variables have been split into multiple root nodes corresponding to the numbers for each of the columns, whether price, item number, salesperson, etc. By concatenating the column number onto the variable before it is sent to the K, the root node counts for each of the columns has been maintained. For instance, in FIG. 7, using the same source data, the variable '100' was used 22 times, but the field, or the column from which the variable came, was lost. FIG. 9 shows that there are 11 occurrences of variable '100' within the context of column '3', the item number column, and 11 occurrences of the variable '100' within the context of column '5', the price column.

FIG. 10 is the same dataset as in FIG. 6, but has been updated using another preferred method of the invention whereby the field names were saved by an administrative function, sending the field names to the Learn Engine instead of the column number, causing the field name to be concatenated instead of the column or sequence number. The column names have been concatenated onto the data with a spacer or delimiter ':'.

Figure 11:
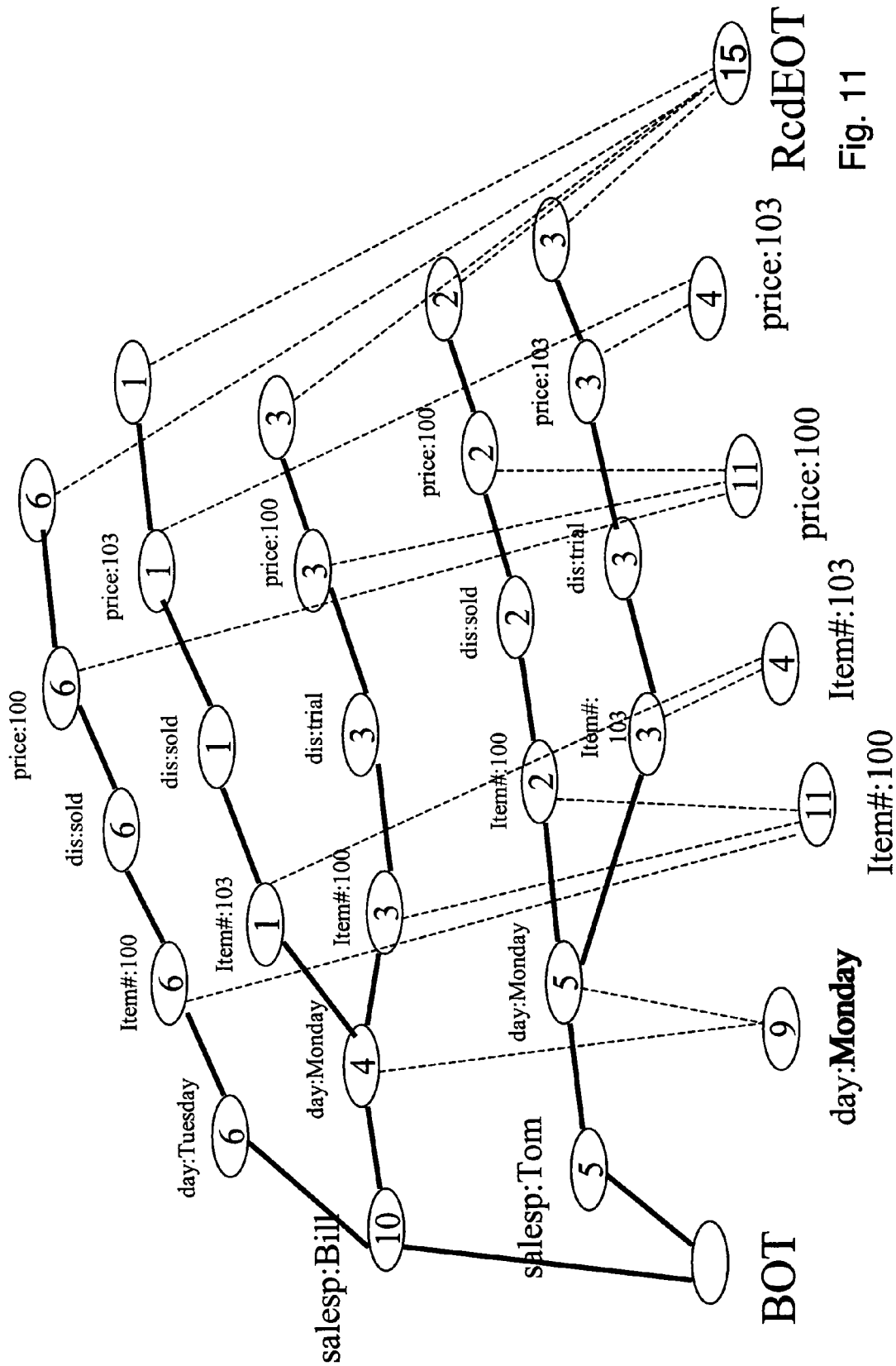
FIG. 11 is a diagram of the Kstore structure developed from the data of FIG. 6 as represented in FIG. 10 employing another preferred method of the invention

FIG. 11 is a diagram of a set of nodes forming a K built from the data in FIG. 10. Note that although the subcomponent nodes structure of the Kstore is unchanged from FIG. 7, the root nodes for the variables include a variable value as well as the field names, corresponding to the sensors for each of the columns, whether price, item number, salesperson, or the like. By concatenating the column name onto the variable the root node counts for each of the columns can be seen. For instance, in FIG. 7, using the same source data, the variable '100' was used 22 times, but the column from which the variable came, was not seen. FIG. 11 shows that there are 11 occurrences of variable '100' from column 'tem#', and 11 occurrences of the variable '100' from the column 'price'.

Figure 15:
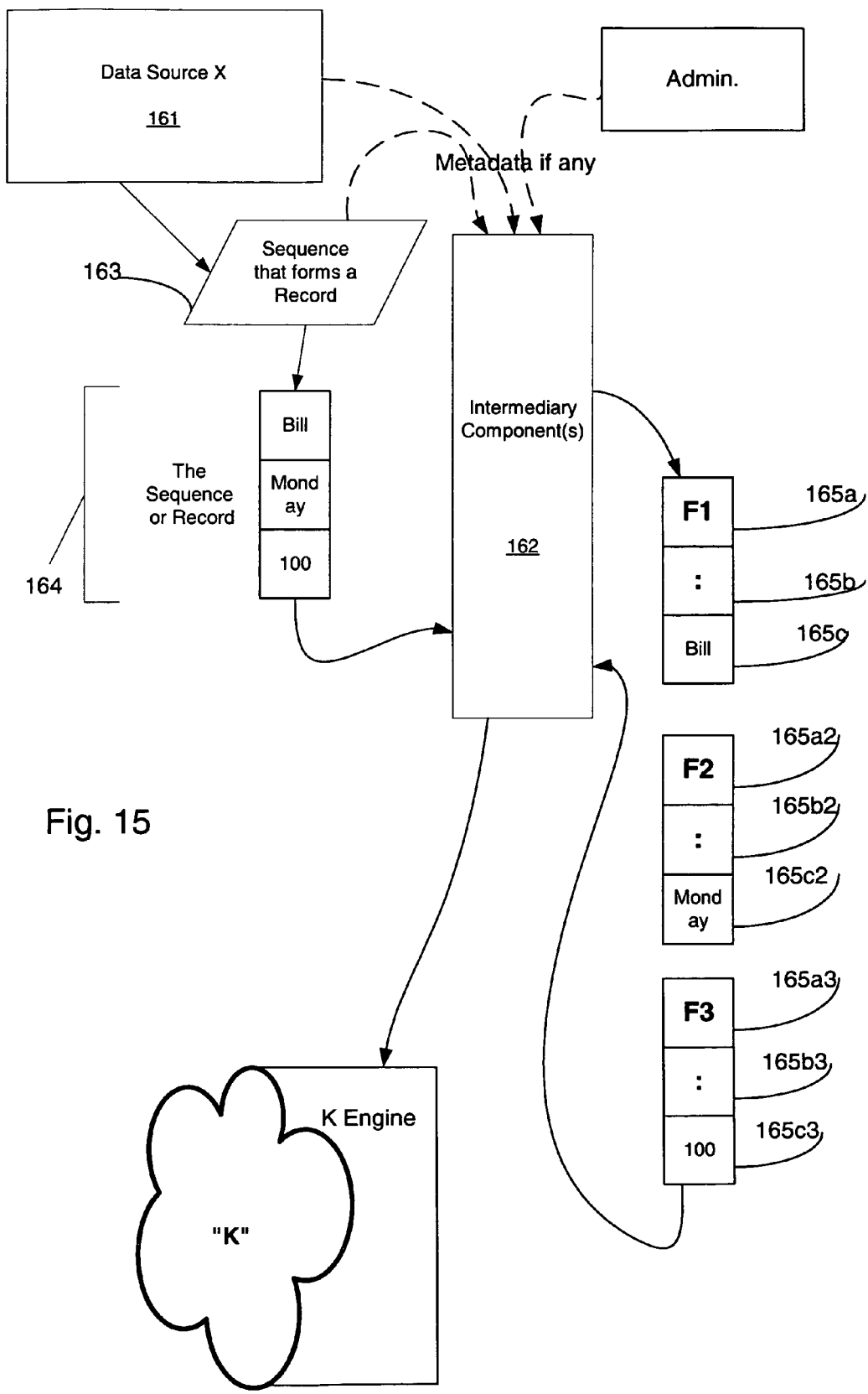
FIG. 15 is a block diagram illustrating preferred embodiment transfers of a data record into a KStore.

To summarize the process of inserting field identifiers into record sequences we refer to FIG. 15, where the data source 161 provides a sequence of data that forms a record 163. This record may have metadata associated with it, it may be encapsulated in HTML or other wrappers, it may be concatenated to other records in a stream, it may be real time or historical, in short it can be a record of any thing in any form so long as it contains field/record data. The metadata may be sent to an applications level component or directly to the Learn Engine, which in this diagram are illustrated as a single component, block 162. The metadata can be sent through the sequence, directly from the data source, or through some administrative function 166 that is controlled by an applications developer or by an application overseeing the transfer of data into the K.

The sequence itself 164 in this heuristic example included three fields with variables Bill, Monday and 100. The fields in the sequence of data do not have names. The names or designations are given by the intermediary component(s) block 162, which produces a stream of data including them. This stream, (or, it could be in table form if desired, but here it is illustrated as a sequence, to make it easy to visualize the particlization process for the data illustrated), includes in this example a delimiter between each field name and field variable. Thus, field (or column) name 165a is F1, and the delimiter ":" 165b are concatenated to the field variable Bill 165c. The same is done for the subsequent field variables; thus field name F2 165a2 is concatenated with a delimiter ":" 165b2, and field variable Monday 165c2, while field F3 165a3 is concatenated with delimiter 165b3 and field variable 165c3. A line directs this data formation back into the block 162 where it gets particlized and sent in a particle stream to the K Engine to record the events into the K.

The methods and system described above may be embodied in the form of program code (i.e., instructions) stored on a computer-readable medium, such as a floppy diskette, CD-ROM, DVD-ROM, DVD-RAM, hard disk drive, memory stick, main memory, or any other machine-readable storage medium, currently known or presently unknown wherein, when the program code, which itself is a set of organized data signals in electronic, optical or other form, is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code may be implemented in a high level programming language, such as, for example, C, C++, or Java. Alternatively, the program code may be implemented in assembly or machine language. In any case, the language may be a compiled or an interpreted language.

It is noted that the foregoing examples have been provided merely for the purpose of explanation and are in no way to be construed as limiting of the present invention. For example, the interlocking trees datastore can be implemented using object-oriented technologies, procedural technologies, a hybrid thereof or any other suitable methodology. Furthermore, although the examples presented show the dataset elements stored in a memory, one of skill in the art will understand that this functionality can be implemented in many different ways. For example, the invention contemplates the use of many different sets of dataset elements of many different universes stored on multiple remotely located machines.

While innumerable uses for this invention may be found, and significant variability in the form and manner of operation of this invention are described and will occur to those of skill in these arts, the invention is not limited in scope further than as set forth in the following claims.

What is claimed is:

1. A method of integrating knowledge of data record field contexts into an interlocking trees datastore structure, whereby said field contexts remain distinguishable when said record is recorded into said interlocking trees datastore structure via association of a field identifier with each field variable in said data record, the method comprising:
receiving said data record from a data source,
including a field identifier for each field variable in said record,
particlizing said record in an order such that a field identifier for each variable is included in a particle sequence corresponding to said record, and
sending said particle sequence to a K Engine for recording into an elemental root node of the interlocking trees datastore structure, the interlocking trees datastore structure comprising elemental root nodes, subcomponent nodes and end-product nodes using asCase and asResult bi-directional links for determining paths within the interlocking trees datastore structure, wherein an asCase path comprises a sequence of sub-component nodes linked with bi-directional asCase links ending with an end-product node and where each sub-component node in the asCase path has a bi-directional asResult link to an elemental root node or end-product node comprising an asResult path, wherein said K Engine records said data record by creating a unique node sequence in said interlocking trees datastore structure for each first occurrence of a field identifier, field variable combination during a recording of said data record from a given data source.

2. The method of claim 1 further comprising setting an indicator to cause a learn function to annex said field identifier to each said field variable in said data record received by said learn function.

3. The method of claim 2 wherein said application level component creates a data stream for said learn function from said data source and in so doing associates said field identifiers with each field variable in each record sequence received from said data source.

4. The method of claim 3 wherein said application level component is an Extract Transform and Load or a Filter function component.

5. The method of claim 3 wherein said application level component receives data from said data source in data source sending format and configures it to be in a format that has only the data desired.

6. The method of claim 3 wherein the data desired is determined by an applications developer.

7. The method of claim 3 wherein the data desired is predetermined.

8. The method of claim 3 wherein said application level component removes HTML Tags and delimiters from data from said data source.

9. The method of claim 3 wherein said application level component adds additional coincident reference data to said sequence.

10. The method of claim 1 wherein said including process further comprises inserting a delimiter between said field identifier and said each field variable.

11. The method of claim 1 wherein prior to said creating the unique node sequence, field identifiers are established for each field of said data record.

12. The method of claim 11 wherein establishing said field identifiers for each field of said data record occurs in a Learn Engine, and wherein said Learn Engine is configured by an applications developer directed configuration process, or by an application directed configuration process, prior to said Learn Engine receiving substantially any data from a source for said data record.

13. The method of claim 11 in which said step of establishing field identifiers occurs in an application level component, and wherein a said application level component connects to at least one data source through a process comprising:
   data is sent from said at least one data source to said application level component, establishing a set of field identifiers based on said sent data.

14. The method of claim 13 wherein after said data is sent from said at least one data source to said application level component, identifying in said sent data, field identifiers.

15. A computer readable storage medium including digitally encoded data readable by a processing system providing a KStore stored therein, said KStore said KStore comprising a plurality of asCase and asResult paths, wherein an asCase path comprises a sequence of sub-component nodes linked with bi-directional asCase links ending with an end-product node, wherein each sub-component node in the asCase path has a bi-directional asResult link to an elemental root node or end-product node comprising an asResult path, said KStore having a quantity of sets of nodes for identifying field and field variable concatenations, each set of said nodes for identifying, identifying a given field in any record sequence and an associated field variable value, wherein each field and field variable concatenation is recorded into an elemental root node of the interlocking trees datastore structure in an interlocking trees datastore structure comprising elemental root nodes, subcomponent nodes and end-product nodes using asCase and asResult bi-directional links for determining paths within the interlocking trees datastore structure, wherein record data of the record sequence is recorded by creating a unique node sequence in said interlocking trees datastore structure for each first occurrence of a field identifier, field variable combination during a recording of said record data from a given data source.

16. The computer readable storage medium of claim 15 wherein between each field variable in a path from a BOT node to an EOT node a field identifying node is recorded.

* * * * *